United States Patent [19]

Franzen, Jr. et al.

[11] 4,212,894

[45] Jul. 15, 1980

[54] SOFT-MOIST PET FOOD PROCESS

[75] Inventors: Roger W. Franzen, Jr., Pleasantville, N.Y.; Charles J. Cante, St. Anne, Ill.; Joseph J. Griffin, Bronx, N.Y.; Robert E. Schara, Norwalk, Conn.; Charles T. Stocker, Augusta, Mich.

[73] Assignee: General Foods Corporation, White Plains, N.Y.

[21] Appl. No.: 952,524

[22] Filed: Oct. 18, 1978

[51] Int. Cl.$^2$ .............................. A23B 4/02; A23B 4/14
[52] U.S. Cl. .................................... 426/332; 426/518; 426/521; 426/805
[58] Field of Search ............... 426/250, 332, 335, 805, 426/518, 521, 696

[56] References Cited

U.S. PATENT DOCUMENTS

| | | | |
|---|---|---|---|
| 3,202,514 | 8/1965 | Burgess et al. | 426/532 |
| 3,482,985 | 12/1969 | Burgess et al. | 426/250 |
| 3,653,908 | 4/1972 | Buck et al. | 426/332 |
| 3,736,148 | 5/1973 | Katz | 426/335 |
| 3,769,042 | 10/1973 | Kaplow et al. | 426/332 |
| 4,001,445 | 1/1977 | Horrocks et al. | 426/250 |
| 4,020,187 | 4/1977 | McCulloch et al. | 426/335 X |
| 4,055,676 | 10/1977 | Foulkes | 426/332 |

*Primary Examiner*—William F. Smith
*Attorney, Agent, or Firm*—Mitchell E. Alter; Daniel J. Donovan; Bruno P. Struzzi

[57] ABSTRACT

Disclosed is an improved process for preparing shelf-stable, intermediate-moisture pet foods. The process provides a new meat storage unit operation wherein the meats are ground, slurried in flowable form in a preservative solution, and stored in slurry form. The preservative system will preferably comprise the liquid preservatives employed in the final pet food product. According to the best mode, ground raw meat is slurried with a solution containing propylene glycol, sodium chloride, potassium sorbate and phosphoric acid to achieve a slurry pH of from 4.8 to 5.5. The slurry is stored at a temperature of between 30° and 60° C. The new unit operation of storing meats eliminates the labor, energy and capital intensive storage of meats in frozen or refrigerated form.

20 Claims, No Drawings

SOFT-MOIST PET FOOD PROCESS

BACKGROUND OF THE INVENTION

This invention relates to pet foods and, more particularly, to an improved process for preparing meat-containing pet foods of the shelf-stable, intermediate-moisture variety.

Prior to the 1960's, animal foods were sold either in dry or canned form. The dry variety of animal foods usually contained less than 10% moisture and, hence, did not require sterilization procedures or refrigeration in order to render them resistant to microbial decomposition. The dry animal foods, however, were generally characterized by their low degree of palatability, it being found that as a general rule, palatability was enhanced at higher moisture contents.

Canned animal foods have offered a significant degree of palatability owing primarily to their high moisture contents, typically in the area of 75%. However, these high moisture contents required sterilization, generally by retorting, and refrigeration once the canned product was opened. Thus, canned foods had the disadvantages of high processing costs and reduced consumer convenience.

A significant contribution to the pet food field was made by Burgess et al in U.S. Pat. No. 3,202,514. Therein is described an intermediate-moisture animal food based principally upon proteinaceous meaty materials, which is shelfstable and resistant to microbial decomposition without the need for sterilization, refrigeration or aseptic packaging. Foods of this type contain, typically, 15 to 30% water and are stabilized against deterioration by "water soluble solutes", principally sugar. The function of these solutes is to bind the water present and make it unavailable for supporting microbial growth.

While the product of Burgess et al advanced the state of the art, the process for preparing it still required the use of freezing or refrigeration to store the meats prior to processing in the formulation. The freezing and refrigeration of meats both require large capital investments and entail large continuing costs for energy and labor. In the case of frozen meats, the meats are usually shipped in blocks which must be stored in suitable warehouses prior to use. The blocks are then hand loaded onto conveyers which feed them into choppers wherein they are chopped prior to being fed to the cooking and blending operations. Refrigerated storage is likewise costly.

Thus, the meat has been handled by costly conventional procedures since the time of Burgess et al despite the fact that the technology taught by that patent enabled the marketing of meat in unconventional form.

More recent patents have extended the technology of shelf-stable, meat-containing food products to include those which are higher in moisture and contain lower sugar levels. Exemplary of these is U.S. Pat. No. 3,985,904 to J. W. Bernotavicz wherein a cooked, proteinaceous meaty material, having a moisture content of above 50% by weight and a water activity above 0.90, is maintained in a shelf-stable condition by virtue of sufficient non-toxic acids and an effective amount of antimicrobials.

In another variation of the shelf-stable meat concept, U.S. Pat. No. 4,001,445 to Horrocks et al describes a process which retains the substantially raw appearance and characteristics of meat chunks by infusion with sufficient edible water soluble solute to stabilize it against microbial spoilage and then packing the infused material in the absence of oxygen. This reference, discloses that chunks of raw meat can be stabilized without the need to grind the meat into fine particles as is discussed in the Burgess et al and Bernotavicz patents cited above which are representative of the method of processing meat in this regard.

Horrocks et al teaches infusing chunks of meat with sufficient water binder to obtain an $A_w$ of less than 0.85. With this low $A_w$, the product, like that of Burgess et al, will remain stable indefinitely. Stability of this duration would, according to the patent, allow shipment where refrigeration was not available. The moisture contents of these chunks is around 30%, typical for intermediate-moisture meats.

The introduction of large pieces of raw meat and meat by-products directly into the process stream according to current technology presents problems of process control. These meats exhibit wide variations in moisture, protein and fat contents, which are detrimental to the efficient production of intermediate-moisture pet foods. Acceptable commercial products must be shelf-stable and meet nutritional guarantees, as well as be highly palatable and provide good value to the purchaser. Where variabilities in essential product and process parameters are not properly noted and adjusted for prior to mixing the meat components with the remainder of the pet food ingredients, correction is usually possible only by the addition of more costly materials to make up for the deficiencies in the blend. Moreover, because present technology results in highly variable meat slurries which can cause these extra costs as well as the need to re-work more material should final product not meet quality control standards, quality control testing must be more frequent than would be desired.

SUMMARY OF THE INVENTION

In view of the above difficulties with prior art processes for preparing intermediate-moisture pet foods, it is an object of the present invention to improve the process by providing a new unit operation for storing perishable meat materials without employing refrigeration or freezing prior to processing.

It is a more specific object of the present invention to provide an improved overall intermediate-moisture pet foot manufacturing process which is more accurately controllable with more uniformity in processing due to the simplification in raw material slurry standarization enabled by the elimination of the need for refrigerated or frozen storage prior to processing.

These and other objects are accomplished according to the present invention which provides an improved process for preparing a meat-containing, intermediate-moisture animal food comprising meaty materials, and sufficient amounts of preservatives to stabilize the final product against microbial deterioration, adapted to be packaged without resort to sterilization and stored for extended periods of time without refrigeration, said process comprising: (a) preparing a flowable slurry of fresh, uncooked meaty material in a solution containing sufficient preservative to maintain the meat free from microbial spoilage for a period of at least five days; (b) holding the slurry at a temperature effective to maintain homogeneity of the slurry including dispersed fat until needed for processing; (c) pasteurizing the meaty material; (d) shaping the pasteurized meaty material, including any additional nutritional ingredients and preservatives, into the desired form; and (e) packaging the shaped animal food in a substantially moisture-impermeable package.

There has been an absence of any recognition in the prior art that the meats can be finely chopped immediately upon receipt at the manufacturing facility and slurried with sufficient amounts of preservative to hold them in flowable form until they are needed for processing, and that employing this type of a procedure will not only eliminate highly costly storage facilities presently required, but will also provide advantages in process control not heretofore obtained. Thus, according to the present invention, the preserved meat slurries are taken intact, including the preservative solution, and employed preferably to comprise the total meaty content of the pet food.

DETAILED DESCRIPTION

The preparation of intermediate-moisture animal foods, especially pet foods such as for dogs, has become well established within the past ten to fifteen years since the invention of Burgess et al in U.S. Pat. No. 3,202,514. The present invention provides an improved process for preparing products of the type described by Burgess et al, as well as other meat-containing, intermediate-moisture animal foods employing sugar contents below the minimum 15% and moisture contents greater than the 30% maximum set forth.

The present invention is primarily directed at the manufacture of pet foods containing meaty materials. However, the animal food should preferably also contain sufficient additional nutritional ingredients to provide a nutritionally-balanced food for the animal for which it is intended.

The flowable stabilized slurries of this invention will contain sufficient liquid material to maintain them flowable and pumpable over extended periods and will not usually contain the dry solids other than those needed for the limited preservation control. Thus, because the dry ingredients such as meat meal, non-meat proteinaceous materials, farinaceous materials, nutritional supplements and the like, when used in the final product formulation, are not added to the slurry during storage, the moisture content and the water activity, $A_w$, of the slurry will remain quite high. Typically, the moisture content will exceed 50% and will preferably be in the range of from 60 to 75% The $A_w$ will be above 0.88 and preferably be above 0.90.

The term "flowable" means that the slurry will exhibit a Brookfield viscosity of less than 700,000 centipoises as measured by a model HAT Brookfield viscometer set at 5 RPM using an "F" T-bar spindle on a helipath stand at the process temperature which can be between about 30° C. and 60° C. Preferably, the viscosity will be below 400,000 centipoises. Slurries being flowable according to this definition provide efficient processing including blending and pumping.

To obtain shelf stability, the products will be of the intermediate-moisture variety, i.e., from 15 to 50% moisture, and must contain sufficient suitable preservatives in the final product to obtain the requisite shelf stability. Thus, the preservatives in the slurry may be supplemented as is found necessary to obtain the long-term shelf stability required for a commercial product.

Useful "meaty materials", which are held for limited periods of time in stabilized pumpable meat slurries, according to the present invention, are "meat" and "meat by-products". The term "meat" is understood to apply not only to the flesh of cattle, swine, sheep and goats, but also horses, whale and other mammals, poultry and fish. The term "meat by-product" is intended to refer to those non-rendered parts of the carcass of slaughtered animals including, but not restricted to, mammals, poultry and the like. Both the terms "meat" and "meat by-products" include such ingredients as are embraced by the terms as defined in the official publication of the Association of American Feed Control Officials, Incorporated. The preferred meaty materials of use in this invention are fresh meaty materials, i.e., chilled or frozen, uncooked meaty materials. The meaty materials can be enzymatically treated if desired.

Meat meal as such is not considered a meaty material according to the present invention. The term "meat meal" refers to the finely ground, dry, rendered residue from animal tissues, including those dried residues embraced by the term "meat meal" as defined by the aforesaid association. Because the meat meals are dried under conditions of moist heat, they are already of relatively stable bacterial count and do not markedly increase in bacterial count over significant periods of storage. Thus, meat meal would not be a meaty material for which the present new unit operation of meat storage prior to processing would be required. Meat meal will not ordinarily or preferably be added to the slurry prior to the cooking or pasteurization stage. It can, however, be added earlier where desired to standarize the nutritional content in terms of fat, protein, etc., as may be necessary for process control, if it does not so raise the slurry viscosity as to make it non-flowable and, therefore, unpumpable.

The meaty material will preferably constitute a significant portion of the product prepared according to this invention, typically it will be greater than about 10% by weight and preferably greater than 25%. A usual range for such ingredients is about 25% to 40%, preferably 30% to 40%, by weight.

Apart from the meaty material and the preservation system, the product of this invention may optionally, though preferably, contain other proteinaceous ingredients, texturizers, vitamins, minerals, colorings, flavorings and the like.

Non-meat proteinaceous materials i.e., protein sources other than meaty material, as well as meat meal, are preferably employed to achieve a fully-balanced, nutritional feed ration. Typically, the protein will be derived from a vegetable protein source such as soybean, cottonseed, peanuts and the like. The protein may be present in the form of meal, flour, concentrate, isolate or the like. A preferred protein source is soy. Additional protein and flavor may be derived from meat meal and milk products such as dried buttermilk, dried skimmed milk, whey, casein and other like protein sources, such as eggs or cheese.

The preservation of moisture-containing, meaty foods from microbial decomposition is dependent upon a variety of factors and mechanisms. There are some generally well accepted preservation mechanisms and systems which have evolved in the art, and any preservation system effective for achieving shelf stability in the final product, which is acceptable for the intended species of animal, can be employed in the process of the present invention as far as the requirements of the ultimate product preservation system are concerned.

Thus, for example, the prior art products generally employ sugars, salts, polyhydric alcohols and acids as water binders together with antimicrobials such as sorbic acid and its salts.

The usual preservative mechanisms are generally based on a combination of the above principles and exert a combined stabilizing effect. The disclosure of Burgess, et al, U.S. Pat. Nos. 3,202,514, Bernatovicz, 3,985,904 and Horrocks, et al, 4,001,445 are incorporated by reference in his regard. The stabilized pumpable meat slurries of the present invention preferably do not, however, contain sufficient amounts of preservatives to maintain longer term shelf stability, but will usually be effective for periods of only up to 15 days or so and still provide consistently low bacterial and mold counts to be used in what could be considered good manufacturing practice.

The present invention will not necessarily require that all of the preservation materials employed in the final product be employed in the preservation of the meat slurry for the short period of time from receipt into the plant to manufacture into the final pet food material. This initial period of storage will typically range from about one day up to about five days. To provide a practical degree of safety with cost effectiveness, however, it is considered preferable that the preservation system be capable of maintaining the pet food meaty materials without refrigeration or freezing for a period of up to at least ten days and preferably a few days longer, say up to fifteen days, to guard against severe inventory problems which may occur despite the best planning.

Intermediate-moisture food preservation systems typically employ preservative materials which are antimicrobial and also materials which control the amount of moisture in a system available as a growth medium. The expression typically employed for defining the amount of water available to support microbial growth is the water activity, $A_w$, of a product. The $A_w$ is equal to the vapor pressure of water in the system divided by the vapor pressure of pure water at the same temperature. Theoretically, the $A_w$ of a given system can be lowered to such a degree that the water is not sufficiently available to support any microbial growth. However, to achieve the proper taste and texture for the products contemplated by this present invention, it is not possible as a practical matter to obtain these low $A_w$ values. Where the $A_w$ of the system is not lowered to the absolute point below which organisms will not grow, antimicrobials are also added. Typically, these antimicrobial agents are added to control mold growth which is not sufficiently retarded at the $A_w$ values involved.

The water activity of the preserved slurries of the present invention will preferably not be at the low level necessary for long term preservation, and in fact, will preferably be above 0.88 as a function of the high moisture content necessary to maintain slurry pumpability without the need for large amounts of liquid plasticising additives. Because the major portion of the dry raw materials is not in the slurry, the moisture content and $A_w$ will be higher than would be necessary to have a self-stable product.

The final products prepared by the present process, as distinguished from the stabilized pumpable slurries, have water binding ingredients dispersed throughout in amounts sufficient to achieve $A_w$ values of below about 0.93, and further preferably have in contact therewith an antimicrobial agent. The level of the water binding ingredients and antimicrobial agent is sufficient to keep the product resistant to microbial growth and decomposition when packaged in a substantially moisture-impermeable packaging material. The level of antimicrobial agents and $A_w$ lowering ingredients will be balanced to achieve stability at the given moisture content. For example, it may be necessary to employ only a minor amount of antimicrobial agent where the $A_w$ of a given intermediate moisture system is at a level nearly precluding all growth. Conversely, larger amounts of antimicrobial agents may be needed in a moisture containing system wherein the $A_w$ is closer to 0.93. It is preferred to employ levels of sorbate salt or sorbic acid antimicrobials effective to prevent mycotic or bacterial growth.

Useful as water binding ingredients are any of the edible materials which have the ability to tie up water to such an extent that it is no longer usable for microbial growth and propagation. Exemplary of this group of materials are sugars, polyhydric alcohols, mixtures thereof, and mixtures of alkali metal or alkaline earth salts with sugar and/or one or more polyhydric alcohols.

The polyhydric alcohols useful as liquid preservatives for use in the meat slurries of the present invention are preferably polyhydric alcohols having from 3 to 7 carbon atoms. Preferred di-hydric alcohols are 1,2-propanediol and 1,3-butanediol. Glycerine, a tri-hydric alcohol, is a very effective water binder and may be used alone or in combination with a di-hydric alcohol. Other useful polyhydric alcohols include tetriols such as erythritol or the threitols; pentitols such as ribitol or xylitol; hexitols such as sorbitol or mannitol; and heptitols such as perseitol or volemitol.

Sugars useful as water binding agents in the present invention include the reducing and non-reducing water soluble mono- and polysaccharides; e.g., pentoses such as xylose and arbinose; hexoses such as glucose, fructose or galactose; and disaccharides such as lactose surcrose and maltose. To be effective as a bacteriostatic agent, the sugars are preferably water soluble and of such a low molecular weight as to be effective in increasing the osmotic pressure of the aqueous system in which it is dissolved. Preferred sugars for the purposes of this invention are sucrose, dextrose and highly converted corn syrups, especially high fructose corn syrups. The commercial sugar syrups are advantageously employed as liquid preservatives in preparing the meat slurries of the present invention.

Various alkali metal and alkaline earth metal halide salts are also effective water binding agents. Preferred salts are sodium chloride and calcium chloride.

The provision of an acid medium by the addition of acid or acid salts will also aid in preventing microbial decomposition. Preferred acids include phosphoric, citric, malic, fumaric, hydrochloric, sulfuric, lactic, acetic, adipic and the other known non-toxic acids. Phosphoric acid is the most preferred due to its use as a source of phosphorous. Similarly, the provision of an alkaline environment can aid in preparation. Preferred alkaline materials are calcium hydroxide and sodium hydroxide. The preferred preservation solutions for preserving the slurries of meaty materials according to the present invention will contain a polyhydric alcohol, such as propylene glycol, and an antimicrobial such as potassium sorbate. The most preferred systems will also contain other water binders in the form of salts and sugars and contain acid or alkaline materials to modify the pH from near neutral to a value less conducive to microbiological growth. It is to be understood that pH adjustment is not required according to the present invention, however, where pH values above or below near neutral are employed, it is generally considered preferred to adjust the pH of the final product to a level where the intended animal will find the product palatable. This can be done by overt addition of a neutralizing medium or by the natural buffering capacity of the dry ingredients.

A particularly preferred system contains propylene glycol, potassium sorbate, sodium chloride and phosphoric acid to adjust the pH to a value of from 2 to 5.5. The optimum results have thus far been achieved using pH values of about 5 where adequate lowering of the pH is achieved to aid preservation, the slurry viscosity is suitably low due to maintenance of the pH near the system isoelectric point, corrosiveness is not severe, and the pH can be easily adjusted upward to a higher value for dog food palatability. The higher pH values obtained by the use of calcium hydroxide aid in maintaining stability but increase viscosity. However, desirable results can be obtained where an alkaline material is added in quantities sufficient to raise the pH of the slurry to substantially above neutral. For example, calcium hydroxide can be employed at pH values of from 9.0 to 12.0, with pH values of from 10.0 to 11.5 being preferred where alkaline conditions are employed. Neutralization prior to packaging is preferably effected with phosphoric acid.

In accordance with the present invention, the meats will be received from the shipper according to ordinary methods of transport and immediately ground and then slurried with an effective preservative solution. After this initial grinding and slurring, the materials are then passed into a vessel of suitable size awaiting processing. In the further processing, the meaty material, additional nutritional ingredients and preservation ingredients described above are typically mixed, pasteurized, and shaped into the final product form. The pumpable meat slurries are preferably pasteurized after mixing the meat with the other ingredients; pasteurization prior to formulating the final composition is, however, possible.

To prepare a pumpable slurry, the meaty materials must be comminuted as by grinding. This can be achieved in a single or a series of stages. Typically, the meaty materials, usually stored frozen, are first fed to a coarse grinder, such as a Rietz Extructor, which chops the material into pieces ranging in size up to as long as 2 to 4 inches in major dimension, and starts thawing the meaty materials. The coarsely chopped material is then fed into a secondary grinder, such as a Hobart grinder, which continues the thawing process and grinds the meaty material, where the majority of the meat pieces have a maximum diameter of from about $\frac{1}{8}$ to about $\frac{1}{4}$ inch. This type of grinding so far described is conventional and can be successfully employed according to this invention. However, the best results according to this invention are achieved when the meaty material is yet further ground, i.e., finely ground, to an extent that the majority of the meaty particles are no larger than 0.050 to 0.100 inch in diameter. This fine grinding procedure can be performed in a Urschel Comitrol or Seydelmann bowl chopper. To aid the grinding and establish the limited preservation system, the liquid materials in the composition are preferably mixed with the meaty material. Typical of the liquid materials which can be employed are the polyhydric alcohols and corn syrups. Typically, the liquids added will be present at a level of at least 10% of the weight of the meaty material.

After grinding, the meaty material is ready for storage and is preferably mixed with any remaining liquid ingredients of the total formulation, i.e., the animal food matrix, these liquid materials having a preservative function. To accomplish this, the liquid ingredients can be mixed prior to or upon entry into the slurry holding vessel. Thus, in one embodiment, the meat and preservative solution is mixed and then fed into a holding tank; and in another embodiment, these ingredients are mixed in the tank.

The pH and temperature of the slurry are both important parameters for a number of reasons. The pH of the system is important to the maintenance of microbial stability, and to the pumpability of the slurry. To obtain optimum results in terms of these properties yet maintain a relatively non-corrosive material which does not have to be adjusted in pH radically during final product preparation, the pH will be within the range of from 4.5 to 5.5, preferably from 4.8 to 5.2. If the pH is substantially above or below the isoelectric point of the protein material in the slurry, the slurry will not be as easily pumpable at the moisture contents involved. Also affecting slurry viscosity is the temperature at which it is maintained. Where the slurry temperature drops below about 30° C., the fat in the slurry tends to solidify, coming out of dispersion. This solid fat will interfere with stirring and pumping as well as render the slurry non-homogeneous. Preferred slurry temperatures are within the range of from 30° to 60° C. and will preferably be from 35° to 50° C.

By virtue of the present invention, the meaty materials can be held for the period of time necessary for inventory control and then pumped directly to the process for admixture with the remaining pet food ingredients. Among these ingredients are the dry materials, such as meat meal, vegetable protein materials, nutrients and the like discussed above. After mixing, or concurrent therewith, the next process step will usually be pasteurization.

The pasteurization can be performed either continuously or batchwise, and heating can be either direct by injection of steam or indirect by employing a heated jacket on the cooker. Continuous operation with direct steam injection in an extruder-cooker is preferred. Typical of the continuous cooking devices which can be employed are an Anderson extruder-cooker and a Wenger mixer-conditioner.

For batchwise pasteurization, a simple kettle fitted with a stirring device adequate to keep the matrix material under constant agitation, can be employed. Heat should be supplied by direct injection of steam into the matrix materials being pasteurized.

Upon discharge from the cooker, the animal food matrix is preferably cooled prior to shaping into the desired final product form. It is possible with the continuous pasteurization to employ a cooling jacket around the final stage of the extruder-cooker to enable shaping to the desired final size directly upon exiting the extruder. Typically, however, the matrix material is discharged into a separate cooling device which may be of any conventional construction, for example, a wire mesh belt, a perforated deck, or a jet zone cooler, wherein cooled air at a temperature of about 20° C. is directed across the matrix material. To enable optimum shaping and handling characteristics, the matrix material is preferably cooled to a temperature of below 30°

C., and preferably to about 25° C. The final shaping and packaging of the product from this point on can be done in conventional manner, for example, using the teachings of the Burgess et al patent, U.S. Pat. No. 3,202,514, mentioned above.

The following Examples are for the purpose of further illustrating the present invention and not to be taken as limiting in any regard. Unless otherwise indicated, all parts and percentages are by weight.

EXAMPLE I

The improved process of the present invention, employing grinding of the meaty materials and preservation in the form of a flowable slurry, is employed to prepare a dog food from the following materials:

| Ingredient | Parts |
| --- | --- |
| Beef Tripe & Trimmings | 34.0 |
| Soy Grits | 30.0 |
| Sucrose | 16.0 |
| Propylene Glycol | 6.0 |
| Corn Syrup | 2.0 |
| Monocalcium Phosphate | 2.1 |
| Soy Protein Isolate | 1.9 |
| Dried Whey | 1.5 |
| Iodized Salt | 1.25 |
| Calcium Carbonate | 1.0 |
| Soybean Hulls | 1.0 |
| Sodium Carboxymethylcellulose | 0.5 |
| Mono- and Di-Glyceride Emulsifier | 0.5 |
| Flavor, Color, Vitamin and Mineral Supplement | 0.25 |
| Potassium Sorbate | 0.17 |
| Water Sufficient for Processing | (about 1.3) |

Of these, the meaty materials (the tripe and trimmings), propylene glycol, corn syrup and emulsifier are mixed to form a slurry for storage. To form the slurry, the meaty materials are ground frozen through a ⅜ inch hole die on a Hobart grinder. The ground meats are then placed in a small Baker Perkins sigma bladed mixer and the liquids are added to form a slurry. The mix is allowed to mix five minutes and is then removed and placed in a plastic container at room temperature.

The ingredients employed in the slurry are shown in the table below as their percentage of the slurry and as their percentage of the final pet food product:

| Ingredient | % of Slurry | % of Product |
| --- | --- | --- |
| Beef Tripe | 56.5 | 24.0 |
| Beef Trimmings | 23.6 | 10.0 |
| Propylene Glycol | 14.1 | 6.0 |
| Corn Syrup | 4.7 | 2.0 |
| Emulsifier | 1.1 | 0.5 |
|  | 100.0 | 42.5 |

The slurry has: a moisture content of 61.0%, a pH of 6.75 and a water activity of from 0.91 to 0.93. The slurry is allowed to stand for two weeks, after which the meat is alright from an organoleptic standpoint and the standard plate count has dropped from its initial high of 250,000 per gram to 66,000 per gram. This plate count and short term reduction indicates that the starting meats are extremely clean but does not indicate that the product would be stable for extended periods of time; however, it shows the effectiveness of the preservation for the limited storage times with which this invention is concerned.

The dry ingredients are separately blended and then mixed in a Day cooker equipped with sigma arm mixer, with the finely ground meat and liquid mixture. The combined ingredients are then heated at about 82° C. for about 15 minutes to provide the necessary heating for pasteurization.

Upon exiting the cooker, the pasteurized material is cooled by air at about 20° C. to a temperature of 25° C. The cooled extrudate is then shaped in a Bonnot extruder fitted with a die plate having 5/32 inch diameter holes. The formed product is then heat sealed in polypropylene film bags.

EXAMPLE II

The improved process of the present invention, employing grinding of the meaty materials and preservation in the form of a flowable slurry, is employed to prepare a dog food from the following materials:

| Ingredient | Parts |
| --- | --- |
| Beef Tripe and Trimmings | 36.5 |
| Soy Grits | 32.6 |
| Sucrose | 17.4 |
| Propylene Glycol | 5.2 |
| Corn Syrup | 3.0 |
| Phosphoric Acid (86%) | 0.26 |
| Soy Protein Isolate | 1.9 |
| Dried Whey | 1.0 |
| Iodized Salt | 1.25 |
| Monocalcium Phosphate | 0.96 |
| Calcium Carbonate | 1.0 |
| Soybean Hulls | 2.2 |
| Sodium Carboxymethylcellulose | 0.5 |
| Mono- and Di-Glyceride Emulsifier | 0.5 |
| Flavor, Color, Vitamin and Mineral Supplement | .08 |
| Potassium Sorbate | 0.17 |

Of these, the meaty materials (the tripe and trimmings), propylene glycol, potassium sorbate, sodium chloride and phosphoric are mixed to form a slurry for storage. To form the slurry, the meaty materials are ground frozen through a ⅜ inch hole die on a Hobart grinder. The ground meats are then placed in a small Baker perkins sigma bladed mixer and the other materials added to form a pumpable slurry which is stored at 37°–38° C. for five days.

The ingredients employed in the slurry are shown in the table below as their percentage of the slurry and as their percentage of the final pet food product:

| Ingredient | % of Slurry | % of Product |
| --- | --- | --- |
| Beef Tripe & Trimmings | 83.894 | 36.5 |
| Propylene Glycol | 12.050 | 5.2 |
| Sodium Chloride | 2.950 | 1.25 |
| Potassium Sorbate | 0.400 | 0.17 |
| Phosphoric Acid (86%) | 0.706 | 0.26 (dry) |
|  | 100.000 | 43.38 |

The slurry has: a moisture content of 53.5%, a pH of 4.9 and a water activity of approximately 1.0. The slurry is flowable. The slurry is allowed to stand for four days, after which the meat is acceptable from an organoleptic standpoint and the standard plate count does not show a significant variation from its initial value.

The remaining dog food ingredients are blended with the slurry and formed into a dog food as in Example I.

EXAMPLE III

A slurry similar to that of Example II is again prepared, but this time, an amount of water equivalent to the amount of meat added in that example is also added. The formula of the slurry is:

| Meat by-products | 208 grams |
|---|---|
| Water | 208 grams |
| Propylene Glycol | 60 grams |
| Phosphoric Acid (86%) | 3.83 grams |
| Sodium Chloride | 17.7 grams |
| Potassium Sorbate | 2.0 grams |
| | 499.53 grams |

This slurry has: a moisture content of 73.5%, a pH of 4.10, and a water activity of approximately 1.0. This sample of slurry is stored in the same manner as that of Example II and shows no significant increase on standard plate count after four days storage. Thus, the slurry, even with a high $A_w$ and moisture content due to added water is still suitably stable for use in a pet food process where standardization of the slurry required addition of water or started with higher moisture content meats.

EXAMPLE IV

A further slurry according to the present invention is prepared essentially according to the process and formulation of Example II, but this time the sodium chloride and phosphoric acid are omitted and calcium hydroxide was employed at a level sufficient to raise the pH to 11.5. The slurry is stored as in Example II. The stability results are acceptable; however, the slurry is flowable, but the viscosity is higher than that of the prior Examples.

The above description is for the purpose of teaching those skilled in the art how to practice the present invention and is not intended to recite all the possible modifications and variations thereof which will become apparent to the skilled worker upon reading the above description. It is intended, however, that all such modifications and variations be included within the scope of the invention which is defined by the following claims.

What is claimed is:

1. An improved process for preparing a meat-containing, intermediate-moisture animal food comprising meaty materials, and sufficient amounts of preservatives to stabilize the final product against microbial deterioration, adapted to be packaged without resort to sterilization and stored for extended periods of time without refrigeration, said process comprising:
   (a) preparing a flowable slurry of fresh, uncooked meaty material in a solution containing sufficient preservatives to maintain the meat free from microbial spoilage for a period of at least 5 days without refrigeration and having a moisture content in excess of 50% and an $A_w$ in excess of 0.88;
   (b) holding the slurry at a temperature effective to maintain homogeneity of the slurry including dispersed fat until needed for processing;
   (c) pasteurizing the meaty material;
   (d) shaping the pasteurized meaty material, including any additional nutritional ingredients and preservatives, into the desired form; and
   (e) packaging the shaped animal food in a substantially moisture-impermeable package.

2. A process according to claim 1 wherein the slurry is held at a temperature of from 30° to 60° C. prior to processing.

3. A process according to claim 1 wherein the slurry is maintained at a pH within the range of from 4.5 to 5.5 during the period of holding.

4. A process according to claim 1 wherein the slurry has a Brookfield viscosity of less than 700,000 centipoises as measured by a model HAT Brookfield viscometer set at 5 RPM using an "F" T-bar spindle mounted on a helipath stand at the process temperature of between 30° C. and 60° C.

5. A process according to claim 1 wherein the additional nutritional ingredients are mixed with the meaty material after holding in slurry form for in excess of 5 days and prior to being pasteurized.

6. A process according to claim 1 wherein the additional nutritional ingredients are mixed with the meaty material during pasteurization.

7. A process according to claim 1 wherein the $A_w$ of the slurry is greater than 0.90.

8. A process according to claim 1 wherein the moisture content of the slurry is greater than 60% based on the weight of the slurry.

9. A process according to claim 1 wherein the moisture content of the final product is within the range of from 15 to 50% based on the weight of the final product.

10. A process according to claim 1 wherein the $A_w$ of the slurry is greater than 0.90 and the moisture content of the slurry is above 60%.

11. A process according to claim 10 wherein the moisture content of the slurry is greater than 60% based on the weight of the slurry, and the final moisture content of the product is between 20 and 35% based on the weight of the final product.

12. a process according to claim 11 wherein the slurry is held at a temperature of from 30° to 60° C. prior to processing.

13. A process according to claim 12 wherein the slurry is maintained at a pH within the range of from 4.5 to 5.5 during the period of holding.

14. A process according to claim 13 wherein phosphoric acid is added to adjust the slurry pH to 4.5 to 5.5.

15. A Process according to claim 14 wherein the proteinaceous meaty material is finely ground prior to slurrying by (a) admixing coarsely ground proteinaceous meaty material with a liquid component of the animal food, comprising a polyhydric alcohol in an amount of at least 10% based on the weight of the proteinaceous meaty material; and (b) finely grinding the proteinaceous meaty material in the presence of the liquid component to an extent that the majority of meat particles are 0.050 to 0.100 inch in diameter or finer.

16. A process according to claim 15 wherein the slurry has a Brookfield viscosity of less than 700,000 centipoises as measured by a model Hat Brookfield viscometer set at 5 RPM using an "F" T-bar spindle mounted on a helipath stand at the process temperature of between 30° and 60° C.

17. A process according to claim 10 wherein the slurry contains sufficient alkaline material to maintain the pH substantially above neutral during storage.

18. A process according to claim 17 wherein the additional nutritional ingredients are mixed with the meaty material after holding in slurry form for in excess of 5 days and prior to being pasteurized.

19. A process according to claim 17 wherein the alkaline material comprises calcium hydroxide.

20. A process according to claim 17 wherein the pH of the slurry is maintained at a value within the range of from 9.0 to 12.0 during storage.

* * * * *

UNITED STATES PATENT AND TRADEMARK OFFICE
CERTIFICATE OF CORRECTION

PATENT NO. : 4,212,894

DATED : July 15, 1980

INVENTOR(S) : Franzen, Jr. et al

It is certified that error appears in the above-identified patent and that said Letters Patent are hereby corrected as shown below:

In Col. 5 line 10 change "his" to --this--; Col. 5 line 62 change "self-stable" to --shelf-stable--.

In Col. 6 line 31 change "tetriols" to --tetritols--

Signed and Sealed this

Thirteenth Day of January 1981

[SEAL]

Attest:

SIDNEY A. DIAMOND

Attesting Officer

Commissioner of Patents and Trademarks